United States Patent [19]

Bachelard et al.

[11] Patent Number: 4,585,634

[45] Date of Patent: Apr. 29, 1986

[54] PROCESS FOR THE PRODUCTION OF URANIUM TRIOXIDE HAVING A LARGE SPECIFIC SURFACE FROM HYDRATED URANYL NITRATE

[75] Inventors: Roland Bachelard, Lyons; Pierre Lakodey, Saint Priest, both of France

[73] Assignee: Comurhex, Paris, France

[21] Appl. No.: 563,382

[22] PCT Filed: Apr. 29, 1983

[86] PCT No.: PCT/FR83/00083

§ 371 Date: Dec. 5, 1983

§ 102(e) Date: Dec. 5, 1983

[87] PCT Pub. No.: WO83/03820

PCT Pub. Date: Nov. 10, 1983

[30] Foreign Application Priority Data

Apr. 29, 1982 [FR] France ............................ 82 07923

[51] Int. Cl.$^4$ .............................................. C01G 43/01
[52] U.S. Cl. ................................................. 423/260
[58] Field of Search ........................................ 423/260

[56] References Cited

U.S. PATENT DOCUMENTS 2,981,592 4/1961 Lawroski et al. ................... 423/260
3,761,547 9/1973 Grossman et al. ................... 423/260

FOREIGN PATENT DOCUMENTS 2088170 1/1972 France .
2370695 7/1978 France ................................ 423/260
2504112 10/1982 France ................................ 423/260
1054783 1/1967 United Kingdom .

OTHER PUBLICATIONS

Bridge et al., *Chem. Abst.*, 50, (#22), abs. #16498i (1956).

*Primary Examiner*—Edward A. Miller
*Attorney, Agent, or Firm*—McDougall, Hersh & Scott

[57] ABSTRACT

A process for the production of uranium trioxide having a large specific surface by the thermal denitration of hydrated uranyl nitrate corresponding to the formula $UO_2(NO_3)_2 \cdot xH_2O$, in which $2 \leq x \leq 6$, characterized in that, in a first stage, the said nitrate is treated in the form of a liquid at room temperature in the range from 160° C. to 260° C. until a solid phase containing at least 55% by weight of uranium is obtained and, in a second stage, the said solid phase is progressively heated to a temperature of at most 600° C. at a heating rate of at most 1000° C. per hour, and is kept at this temperature of at most 600° C. until a second solid phase of $UO_3$ having a large specific surface is obtained. The $UO_3$ product produced has a specific surface of at least 10 m.$^2$g$^{-1}$.

5 Claims, No Drawings

PROCESS FOR THE PRODUCTION OF URANIUM TRIOXIDE HAVING A LARGE SPECIFIC SURFACE FROM HYDRATED URANYL NITRATE

This invention relates to a process for the production of uranium trioxide having a large specific surface by the thermal denitration in two stages of hydrated uranyl nitrates corresponding to the formula $UO_2(NO_3)_2 \cdot xH_2O$, with $2 \leq x \leq 6$.

It is well known that the production of uranium trioxide ($UO_3$) by the thermal denitration of uranyl nitrate hexahydrate in accordance with the following reaction scheme:

$$UO_2(NO_3)_2 \cdot 6H_2O \rightarrow UO_3 + 2NO_2 + O_2 + 6H_2O$$

is an important stage in processes for the production of uranium hexafluoride comprising the reduction of uranium trioxide to uranium dioxide, fluorination of the uranium dioxide with hydrofluoric acid and, finally, the action of fluorine on the uranium tetrafluoride to form the desired uranium hexafluoride. However, it is equally well known that the $UO_2$ obtained by thermal denitration followed by reduction affords low productivity through lack of reactivity with hydrofluoric acid during its conversion into $UF_4$.

Numerous processes for the production of uranium trioxide have already been described in the specialist literature. Thus, the work entitled "URANIUM PRODUCTION TECHNOLOGY", edited by Charles D. Harrington and Archie E. Ruchle, New York, Edition 1959, pages 181 to 191, describes several processes for the thermal denitration of uranyl nitrate hexahydrate.

A first process, of the batch type, comprises heat-treating a continuously stirred concentrated solution of uranyl nitrate hexahydrate first for 1.5 hours at a controlled temperature of 621° C. of the combustion gases and then for 5 hours at a temperature of 510° C. of those gases and finally, cooling the powder-form product obtained for approximately 30 minutes.

However, as the author himself states, this process is attended by certain disadvantages which limit its development. Firstly, the powder-form product obtained is in fact made up of a mixture of $UO_3$ and $U_3O_8$, this second oxide forming on the walls of the reactor heated to a temperature higher than that prevailing inside said reactor. In addition, if the denitration temperature is too high, it may result in solidification of the above-mentioned mixture of oxides whereas, if it is too low, the mixture of oxides still contains uranyl nitrate and water. Finally, in the most favorable case, i.e. where the powder-form product obtained is $UO_3$ subsequently reduced to $UO_2$, the $UO_2$ obtained shows minimal capacity to react with HF during its fluorination. This minimal capacity of the $UO_2$ to react with HF, which is a measure of the lack of reactivity of the product, is considered by the author himself as being attributable to the small specific surface of the uranium trioxide obtained (0.73 $m^2/g$).

In order to improve the reactivity of the uranium dioxide, the author advises the use of certain aids such as, for example, the introduction of sulfuric acid into the uranyl nitrate solution subjected to the thermal denitration process. However, these aids are limited in their effectiveness because the $UO_3$ obtained has a specific surface not exceeding 2 $m^2 \cdot g^{-1}$.

In another, continuous process, uranyl nitrate hexahydrate is thermally decomposed by introducing an aqueous solution thereof into a stirred bed of powder-form uranium trioxide kept at the denitration temperature. The thermal decomposition of the uranyl nitrate in solution is carried out in a crucible-type reactor, the base of which is electrically heated, by direct contact between the uranyl nitrate solution and the hot $UO_3$ powder filling the crucible of said reactor, the temperature of the denitration medium being kept between 510° C. and 530° C. To enable the bed of powder to be continuously stirred, the denitration reactor is equipped with a stirrer having a horizontal shaft and T-shaped arms which keep the bed stirred. As it is formed, the $UO_3$ is withdrawn from the reactor while the gaseous effluents are collected and treated.

Although this process has the advantage of being continuous, it is attended by disadvantages similar to those mentioned above in reference to the batch process for the denitration of uranyl nitrate hexahydrate. Firstly, the powder-form product obtained may be a mixture of $UO_3$ and $U_3O_8$ because this second oxide may form on the overheated walls of the reactor. In addition, if the denitration temperature is not properly controlled, it may result in solidification of the mixture of uranium oxides if it is too high or may even give a mixture of uranium oxides still containing uranyl nitrate and water if it is too low. Finally, after the powder-form product obtained by this process has been reduced to uranium dioxide, the uranium dioxide obtained shows very little reactivity with the hydrofluoric acid used in the following fluorination stage. As experts have found, this lack of reactivity is associated with the small specific surface or BET surface of the $UO_3$ produced by the process in question (less than 1 $m^2 \cdot g^{-1}$).

It is also known that the thermal denitration of uranyl nitrate hexahydrate can be carried out in a fluidized bed. One such process is described in the publication entitled "The Thermal Denitration of Uranyl Nitrate in a Fluidized Bed Reactor" of the AUSTRALIAN ATOMIC ENERGY COMMISSION, July 1974, pages 1 to 18 (ISBN 0-642-99645-8). This process comprises spraying a concentrated solution of uranyl nitrate into a fluidized bed (fluidization medium; air or steam) of uranium trioxide kept at a temperature of approximately 270° C. The $UO_3$ produced by thermal denitration grows on the granular particles of $UO_3$ initially present in the fluidized bed or even forms new granular particles which are in turn fluidized. However, the uranium trioxide obtained by this process and then subjected to reduction gives a uranium dioxide which shows poor reactivity during the subsequent fluorination stage. This poor reactivity would appear once again to be attributable to the small specific BET surface of the $UO_3$ (less than 1 $m^2 \cdot g/^{-1}$) produced during the thermal denitration process.

In order to increase the reactivity of the $UO_3$ produced by the thermal denitration of uranyl nitrate in a fluidized bed reactor, the authors of the process recommended the introduction of sulfate ions into the uranyl nitrate solution to be treated, in the same way as the specialist literature had previously done. However, the results obtained show that, in this case, the specific BET surface of the $UO_3$ produced cannot be increased beyond 1.5 $m^2 \cdot g^{-1}$.

Thus, all the known processes described in the specialist literature for the production of uranium trioxide by the thermal denitration of uranyl nitrate give a $UO_3$ having a small specific surface (not exceeding 2 $m^2 \cdot g^{-1}$) which, by reduction, gives a uranium dioxide showing poor reactivity in the subsequent fluorination stage, requiring high-capacity industrial installations which are very expensive on account of the poor reaction kinectics and the low yield resulting therefrom.

In addition, the known processes may lead to the formation of a mixture of $UO_3$ and $U_3O_8$ which, during the fluorination stage, in turn gives a mixture of $UF_4$ and $UO_2F_2$—a troublesome impurity which has to be eliminated.

Aware of the above-mentioned disadvantages, applicants—continuing their research—have found and perfected a process for the production solely of uranium trioxide having a large specific BET surface by thermal denitration, the uranium trioxide obtained by this process leading after reduction to a uranium dioxide which is highly reactive with respect to the fluorinating agent with which combines at high velocity and with a maximal yield.

The process according to the invention for the production of uranium trioxide having a large specific surface by the thermal denitration of hydrated uranyl nitrate corresponding to the formula $UO_2(NO_3)_2 \cdot xH_2O$, in which x is in the range $2 \leq x \leq 6$, is characterized in that, in a first stage, the hydrated uranyl nitrate is treated in the form of a liquid at a temperature in the range from 160° C. to 260° C. until a solid phase containing at least 55% by weight of uranium is obtained and, in a second stage, the solid phase obtained is progressively heated to a temperature of at most 600° C. at a heating rate of at most 1000° C. per hour and is kept at that temperature of at most 600° C. until a second solid phase of $UO_3$ having a large specific surface is obtained.

The hydrated uranyl nitrate used in the process according to the invention is in the form of a liquid obtained either by dissolving the nitrate in water, the concentration of the solution obtained not being critical, or by fusion of the nitrate in its water of crystallization.

The first stage of the thermal denitration process according to the invention is generally carried out under reduced pressure to facilitate rapid elimination of the water present before decomposition of the uranyl nitrate begins, although it may also be carried out at atmospheric pressure. In practice, the first stage of the denitration process is carried out under a pressure at most equal to atmospheric pressure.

When the first stage is carried out under reduced pressure, the pressure applied is preferably in the range from 5 to 200 millibars while the temperature to which the liquid uranyl nitrate is heated is preferably in the range form 180° C. to 240° C.

Where the first stage is carried out at atmospheric pressure, the temperature to which the liquid uranyl nitrate is heated is preferably in the range from 220 ° to 260° C.

The treatment time in the first stage of the process is selected in such a way that it leads to the formation of a solid phase containing at least 55% of uranium.

The solid phase obtained during the first stage is then subjected to the second stage of the process according to the invention which is carried out under a pressure at most equal to atmospheric pressure while the temperature of the medium is progressively increased to the temperature of at most 600° C.

In the process according to the invention, it is of advantage for the heating rate applied in the second stage not to exceed 1000° C. per hour, although it is desirable for this heating rate to be in the range from 100° C. per hour to 500° C. per hour.

As already mentioned, the highest temperature at which the second stage of the process is carried out is at most equal to 600° C. although it may with considerable advantage be in the range from 300° C. to 500° C.

When the solid phase emanating from the first stage has been progressively heated to the temperature selected at an adequate heating rate, the reaction medium of the second stage is kept under a pressure at most equal to atmospheric pressure.

The second stage of the thermal denitration process according to the invention is completed by keeping the solid phase thus treated for at most 6 hours at the selected temperature of at most 600° C.

The solid phase collected after the second stage of the process according to the invention is in the form of a powder consisting solely of $UO_3$ which, in most cases, has a specific BET surface at least equal to 10 $m^2/g$, as determined by the method described by S. Brunauer, P. H. Emmet and E. Teller in an Article entitled "Adsorption of Gases in Multimolecular Layers" (J. Am. CHEM. SOC. 60, 309-1938) and applied in accordance with the procedure described in the AFNOR Standard NF-X 11-621-75-11.

After reduction of the $UO_3$ to $UO_2$, for example using hydrogen, the oxide thus reduced shows a very high degree of reactivity with respect to the hydrofluoric acid used in the subsequent fluorination stage. In practice, the process according to the invention may be carried out continuously or in batches.

The first stage of the process is carried out in reactors of known type, such as atmospheric pressure or vacuum evaporators equipped with wipers. The second stage of the process is similarly carried out in reactors of known type, such as rotary furnaces, multistage fluidized-bed furnaces, moving-bed furnaces, vertical shelf furnaces. However, it is also possible to carry out the two-stages of the process according to the invention in reactors of known type comprising at least two treatment zones.

Irrespective of whether the process according to the invention is carried out continuously or in batches, the gaseous effluents are removed as they are formed and then treated by known processes, such as for example the process described in French Pat. No. 2,370,695 which comprises catalytically reducing the nitrogen oxides produced into nitrogen and steam, the heat given off being used for converting the uranyl nitrate into uranium trioxide.

The process according to the invention is illustrated by the following examples.

EXAMPLE 1

This example illustrates the effect of the pressure prevailing in the treatment zone and the effect of the residence time in that zone at the temperature selected in the first stage of the process according to the invention.

To this end, 27 g of an aqueous uranyl nitrate solution having a concentration of approximately 78% by weight [expressed as $UO_2(NO_3)_2$] were introduced into a pilot laboratory apparatus in the form of a 1 liter capacity rotary reactor placed in a bath kept thermostatically at 230° C. The gaseous effluents emanating from the reactor were collected in a condenser.

Three tests were successively carried out in this pilot laboratory apparatus. Test No. 1 was carried out at atmospheric pressure over a period of 75 minutes at 230° C. Test No. 2 was carried out over a period of 60 minutes under a reduced pressure of 30 millibars and at a temperature of 230° C. Test No. 3 was carried out over a period of 30 minutes under a reduced pressure of 30 millibars and at a temperature of 230° C.

For these three tests, the solid phase emanating from the first stage was subjected to the second stage of the process according to the invention which was carried out under the following conditions: the solid phase coming from the first stage was placed in a boat in the form of a layer approximately 8 millimeters thick purged with air. The solid phase was then heated at a rate of 250° C. per hour to a temperature of 500° C. and kept at that temperature for 30 minutes.

The solid phase obtained after this second stage, which consisted of powder-form $UO_3$ deep brick red in color, was subjected to determination of the specific BET surface.

The characteristics of the process according to the invention and of the product obtained are shown in Table I below:

TABLE I

| TEST NO. | | 1 | 2 | 3 |
|---|---|---|---|---|
| 1st stage | Pressure applied in bars | 1 | 0.030 | 0.030 |
| | Bath temperature in °C. | 230 | 230 | 230 |
| | Treatment time in minutes | 75 | 60 | 30 |
| | U-content of the solid phase in % by weight | 60.5 | 63.19 | 62.17 |
| 2nd stage | Heating rate in °C. $h^{-1}$ | 250 | 250 | 250 |
| | Maximum temperature in °C. | 500 | 500 | 500 |
| | Residence time in minutes at the maximum temperature | 30 | 30 | 30 |
| $UO_3$ produced: Specific B.E.T. surface in $m.^2 g^{-1}$ | | 18.3 | 19.3 | 16.9 |

It can be seen from the results set out in Table I that, by applying working conditions which, although very different, are within the ranges characteristic of the process according to the invention, it is possible to obtain on completion of the first stage a solid phase still containing more than 55% by weight of uranium which, on completion of the second stage, leads to a uranium trioxide having a specific BET surface approximately ten times larger than that of the products obtained by conventional processes.

EXAMPLE 2

This example illustrates the effect of the temperature established in the treatment zone in the first stage of the process according to the invention.

Two tests were successively carried out using the pilot laboratory apparatus described in Example 1, in which 27 g of the aqueous uranyl nitrate solution containing approximately 78% by weight of $UO_2(NO_3)_2$ were treated for each test. Test No. 4 was carried out under a reduced pressure of 30 millibars and at a temperature of 190° C. maintained for 2 hours and 45 minutes. Test No. 5 was carried out under a reduced pressure 30 millibars and at a temperature of 220° C. maintained for 2 hours.

For these two tests, the solid phase emanating from the first stage was subjected to the second stage of the process according to the invention which was carried out under the following conditions: the solid phase emanating from the first stage was placed in a boat in the form of a layer approximately 8 millimeters thick purged with air. The solid phase was then heated at a rate of 250° C. per hour to a temperature of 500° C. and kept at that temperature for 30 minutes.

The solid phase obtained after this second stage consisted of powder-form $UO_3$ deep brick red in color and was subjected to determination of the specific BET surface.

The characteristics of the process according to the invention and the product obtained are set out in Table II below:

TABLE II

| TEST NO. | | 4 | 5 |
|---|---|---|---|
| 1st stage | Pressure applied in bars | 0.030 | 0.030 |
| | Bath temperature in °C. | 190 | 220 |
| | Treatment time in minutes | 165 | 120 |
| | U-content of the solid phase in % by weight | 61.5 | 64.0 |
| 2nd stage | Heating rate in °C. $h^{-1}$ | 250 | 250 |
| | Maximum temperature in °C. | 500 | 500 |
| | Residence time in minutes at the maximum temperature | 30 | 30 |
| $UO_3$ produced: Specific B.E.T. surface in $m.^2 g^{-1}$ | | 23.8 | 23.5 |

It can be seen that, by varying the temperature established in the treatment zone of the first stage within the limits stipulated for the process according to the invention, it is possible to obtain after the first stage a solid phase which still contains more than 55% by weight of uranium and which, on completion of the second stage, gives a uranium trioxide having a specific BET surface approximately 14 times larger than that of $UO_3$ produced by conventional processes.

EXAMPLE 3

This example illustrates the effect of the heating rate in the second stage of the process according to the invention.

Three tests were successively carried out in the pilot laboratory apparatus described in Example 1, in which 27 g of an aqueous uranyl nitrate solution containing approximately 78% of $UO_2(NO_3)_2$ were treated for each test.

The first stage of each of the three tests was carried out under a reduced pressure of 30 millibars and at a temperature of 200° C. which was maintained for 2 hours.

The solid phase collected on completion of the first stage contained 60.5% by weight of uranium. This solid phase was then subjected to the second stage of the process according to the invention, each test being carried out at different heating rates in the second stage.

In test No. 6, the solid phase emanating from the first stage was heated to the temperature of 500° C. at a heating rate of 100° C. per hour. The solid phase heated to the temperature of 500° C. was then kept at that temperature for 2 hours.

In test No. 7, the solid phase emanating from the first stage was heated to the temperature of 500° C. at a heating rate of 250° C. per hour. The solid phase heated to the temperature of 500° C. was then kept at that temperature for 30 minutes.

In test No. 8, the solid phase emanating from the first stage was heated to the temperature of 500° C. at a heating rate of 1000° C. The solid phase heated to the temperature of 500° C. was then kept at that temperature for 2 hours.

In tests 6 and 7, the solid phase obtained on completion of the second stage consisted of powder-form $UO_3$ deep brick red in color; in test 8, it consisted of solid $UO_3$. The $UO_3$ thus produced for each of the tests was subjected to determination of the specific BET surface.

The characteristics of the process according to the invention and of the product obtained are set out in Table III below:

TABLE III

| TEST NO. | | 6 | 7 | 8 |
|---|---|---|---|---|
| 1st stage | Pressure applied in bars | 0.030 | 0.030 | 0.030 |
| | Bath temperature in °C. | 200 | 200 | 200 |
| | Treatment time in minutes | 120 | 120 | 120 |
| | U-content of the solid phase in % by weight | 60.5 | 60.5 | 60.5 |
| 2nd stage | Heating rate in °C. $h^{-1}$ | 100 | 250 | 1000 |
| | Maximum temperature in °C. | 500 | 500 | 500 |
| | Residence time in minutes at the maximum temperature | 120 | 30 | 120 |
| $UO_3$ produced: Specific BET surface in $m^2.g^{-1}$ | | 21.9 | 17.5 | 5.6 |

Table III above shows that, by varying the heating rate in the second stage within the limits stipulated for the process according to the invention, it is possible on completion of the second stage to obtain a uranium tioxide having a large specific surface when the heating rate is in the preferred range (100° $C.h^{-1}$ to 500° $C.h^{-1}$), whereas the uranium trioxide obtained when the heating rate is at the upper limit of the stipulated range (1000° $C.h^{-1}$) has a specific BET surface only about three times larger than that of uranium trioxide produced in accordance with the prior art.

EXAMPLE 4

This example illustrates the linking of the two stages of the process according to the invention using for the first stage the same reactor as in Example 1 and, for the second stage, a fixed-bed reactor having an internal diameter of 27 millimeters and comprising a porous diffusor for the passage of a gas, the solid product to be treated being placed on the diffusor while the heating of the tubular reactor is provided by an electrical sleeve.

To this end, the first stage of the process was carried out by introducing 30 g of an aqueous uranyl nitrate solution (concentration approximately 78% by weight) into the rotary reactor of which the pressure was kept at 30 millibars and the temperature at 190° C. After 165 minutes at the temperature of 190° C., a powder-form solid phase containing 61.5% by weight of uranium was obtained.

The solid phase emanating from the first stage was then placed in the above-mentioned fixed-bed reactor in a quantity of only 17.2 g (for practical reasons of chemical analysis of said phase) to undergo the second stage of the process therein.

The rate of flow of air through the diffusor amounted to 70 liters per hour. The heating rate amounted to 190° C. per hour. The maximum temperature to which said solid phase was heated was 500° C. at which it was kept for 30 minutes.

12.3 g of a powder-form product deep brick red in color were collected at the outlet of the second reactor. Analysis shows that the powder obtained consisted solely of $UO_3$ having a specific BET surface of 26.7 $m^2.g^{-1}$.

EXAMPLE 5

This example illustrates the known process described in "URANIUM PRODUCTION TECHNOLOGY" by Charles D. Harrington and Archie E. Ruehle, 1959 Edition.

To this end, 100 parts of $UO_3$ produced by the process according to the invention (specific BET surface 12.9 $m^2.g^{-1}$) were placed in the bucket of a reactor similar to that described in the prior art to act as a denitration support.

The support thus placed in the bucket was stirred by means of a stirrer having a horizontal shaft.

100 parts of $UO_3$ in the form of $UO_2(NO_3)_2.6H_2O$. were then introduced into the reactor, after which the temperature of the support was increased to 513° C. and kept at that level for 1 hour.

$UO_3$ was then obtained by conversion of the uranyl nitrate hexahydrate and was found to have a specific BET surface of 7.9 $m^2.g^{-1}$, representing a loss of approximately 38% of the initial specific BET surface.

Another 100 parts of $UO_3$ in the form of the hexahydrate were introduced and the temperature of the support increased to 513° C. and kept at that level for 1 hour.

$UO_3$ was then obtained by conversion of the uranyl nitrate hexahydrate, its specific BET surface amounting to no more than 2.2 $m^2.g^{-1}$ which represents a loss of approximately 83% of the initial surface.

The introduction of uranyl nitrate hexahydrate was stopped after this second introduction because the reduction in the specific BET surface was such that it was virtually at the level of the poor specific BET surface values described in the prior art.

We claim:

1. A process for the production of uranium trioxide having a large specific surface by the thermal denitration of uranyl nitrate hexahydrate corresponding to the formula $UO_2(NO_3).-xH_2O$, in which $2 \leq x \leq 6$, the improvement comprising carrying out the denitration process in two stages, said first stage comprising heating liquid uranyl nitrate hexahydrate to a temperature in the range of from 160° C. to 260° C. to obtain a solid phase containing at least 55% by weight of uranium, and said second stage comprising progressively heating said solid phase at a heating rate of not more than 1000° C. per hour to a temperature of not more than 600° C. and holding said solid phase at the said temperature for a period of at most six hours to obtain a second solid phase of $UO_3$ having a specific surface larger than 10 $m^2/g$.

2. A process for the production of uranium trioxide having a large specific surface as claimed in claim 1, further comprising carrying out the first stage of the denitration process at atmospheric pressure at a temperature in the range of from 220° C. to 260° C.

3. A process for the production of uranium trioxide having a large specific surface as claimed in claim 1, further comprising carrying out the first stage of the denitration process under a reduced pressure in the range from 5 to 200 millibars and at a temperature in the range of from 180° C. to 240° C.

4. A process for the production of uranium trioxide having a large specific surface as claimed in claim 1 wherein the heating rate in the second stage is in the range from 100° C. per hour to 500° C. per hour.

5. A process for the production of uranium trioxide having a large specific surface as claimed in claim 1 wherein the highest temperature at which the second stage is carried out is in the range from 300° C. to 500° C.

* * * * *

UNITED STATES PATENT AND TRADEMARK OFFICE
CERTIFICATE OF CORRECTION

PATENT NO. : 4,585,634
DATED : April 29, 1986
INVENTOR(S) : ROLAND BACHELARD ET AL.

It is certified that error appears in the above-identified patent and that said Letters Patent is hereby corrected as shown below:

Column 8, line 32, "$7.9\ m^2.g^{31}\ 1$" should be -- $7.9\ m^2.g^{-1}$ --

Signed and Sealed this

Eighth Day of July 1986

[SEAL]

Attest:

Attesting Officer

DONALD J. QUIGG

Commissioner of Patents and Trademarks